United States Patent
Berkyto

(10) Patent No.: US 8,833,312 B2
(45) Date of Patent: *Sep. 16, 2014

(54) EXTERNAL COMBUSTION ENGINE

(71) Applicant: ZED Power International Corporation, St Helier (JE)

(72) Inventor: John Berkyto, Richmond (CA)

(73) Assignee: ZED Power International Corporation, St. Helier (JE)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,613

(22) Filed: Jan. 10, 2013

(65) Prior Publication Data

US 2013/0205744 A1    Aug. 15, 2013

Related U.S. Application Data

(63) Continuation of application No. 12/424,350, filed on Apr. 15, 2009, now Pat. No. 8,375,900.

(51) Int. Cl.
| | | |
|---|---|---|
| *F02B 43/08* | (2006.01) | |
| *F02G 3/00* | (2006.01) | |
| *F02G 1/00* | (2006.01) | |
| *F02C 6/00* | (2006.01) | |
| *F02C 7/06* | (2006.01) | |
| *H01M 8/06* | (2006.01) | |
| *H01M 10/44* | (2006.01) | |
| *H01M 10/46* | (2006.01) | |
| *F02C 3/00* | (2006.01) | |
| *F01K 7/02* | (2006.01) | |
| *F22B 9/04* | (2006.01) | |
| *F02B 43/10* | (2006.01) | |
| *F01K 25/10* | (2006.01) | |

(52) U.S. Cl.
CPC .. *F02C 3/00* (2013.01); *Y02T 10/32* (2013.01); *F01K 7/025* (2013.01); *F22B 9/04* (2013.01); *F02B 43/10* (2013.01); *F01K 25/10* (2013.01)
USPC .............. 123/3; 60/39.6; 60/39.821; 429/421

(58) Field of Classification Search
CPC ........... F01K 7/025; F01K 25/10; F02C 3/00; F22B 9/04; F02B 43/10; Y02T 10/32
USPC ......... 123/3, 1 A, 41.1; 60/39.6, 39.182, 595, 60/670, 512, 653, 514; 48/61; 429/421
See application file for complete search history.

(56) References Cited

U.S. PATENT DOCUMENTS

| 2,937,634 | A | * | 5/1960 | Lupfer et al. | ................. | 123/567 |
| 3,616,779 | A | * | 11/1971 | Kelseaux et al. | .......... | 123/41.86 |
| 3,772,879 | A | * | 11/1973 | Engdahl | ......................... | 60/671 |

(Continued)

FOREIGN PATENT DOCUMENTS

| JP | 60056159 A | * | 4/1985 | ............. | F02M 31/04 |
| JP | 60062650 A | * | 4/1985 | ............. | F02M 31/06 |

*Primary Examiner* — Thai Ba Trieu
(74) *Attorney, Agent, or Firm* — Greenberg Traurig, LLP

(57) ABSTRACT

An external combustion engine fuel that converts the expansion force of a fluid vapor to mechanical force. In some embodiments, the external combustion engine utilizes the coolant passages of an internal combustion engine block to shroud the engine block with the heat of fuel combustion when the expanding fluid vapor is directed into the engine block.

10 Claims, 13 Drawing Sheets

(56) References Cited

U.S. PATENT DOCUMENTS

| | | | |
|---|---|---|---|
| 3,982,910 A * | 9/1976 | Houseman et al. | 48/61 |
| 4,018,190 A * | 4/1977 | Henault | 123/3 |
| 4,077,214 A * | 3/1978 | Burke et al. | 60/512 |
| 4,222,351 A * | 9/1980 | Kosaka et al. | 123/3 |
| 4,350,133 A * | 9/1982 | Greiner | 123/3 |
| 4,362,137 A * | 12/1982 | O'Hare | 123/3 |
| 4,409,931 A * | 10/1983 | Lindberg | 123/3 |
| 4,426,847 A * | 1/1984 | Fischer | 60/514 |
| 4,777,801 A * | 10/1988 | Porter | 60/595 |
| 5,109,669 A * | 5/1992 | Morris et al. | 60/39.821 |
| 5,359,968 A * | 11/1994 | Shiraishi et al. | 123/3 |
| 5,379,728 A * | 1/1995 | Cooke | 123/3 |
| 6,408,613 B1 * | 6/2002 | Shaw | 60/39.6 |
| 6,459,231 B1 * | 10/2002 | Kagatani | 320/101 |
| 6,463,889 B2 * | 10/2002 | Reddy | 123/3 |
| 6,484,491 B1 * | 11/2002 | Thordarson | 60/211 |
| 6,508,060 B2 * | 1/2003 | Clemens et al. | 60/670 |
| 6,627,340 B1 * | 9/2003 | Ovshinsky et al. | 429/421 |
| 6,698,183 B1 * | 3/2004 | Thordarson | 60/39.6 |
| 6,829,894 B2 * | 12/2004 | Bloch et al. | 60/646 |
| 6,951,193 B1 * | 10/2005 | Draper | 123/41.17 |
| 7,047,744 B1 * | 5/2006 | Robertson et al. | 60/670 |
| 7,631,637 B2 * | 12/2009 | Bushnell et al. | 123/557 |
| 7,832,364 B2 * | 11/2010 | Liu | 122/18.1 |
| 8,375,900 B2 * | 2/2013 | Berkyto | 123/3 |
| 2005/0244764 A1 * | 11/2005 | Haase | 431/4 |

* cited by examiner

- PRIOR ART -

EXTERNAL COMBUSTION ENGINE

CROSS-REFERENCE TO RELATED APPLICATIONS

This application claims priority to and the benefit of co-pending U.S. patent application Ser. No. 12/424,350, filed Apr. 15, 2009, entitled "Hydrogen Fueled External Combustion Engine and Method of Converting Internal Combustion Engine Thereto," the disclosure of which is herein incorporated by reference in their entirety for all purposes.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to an external combustion engine, and more particularly, to an engine that converts the expansion force of a fluid vapor to mechanical force.

2. Description of the Related Art

Use of internal combustion engines in vehicles to move people, as well as deliver goods and services, is associated with a variety of air and water quality issues. While a variety of alternates to internal combustion engines have been proposed, limitations associated with these proposals have limited their viability or implementation.

Accordingly, there is need for new and innovative engine designs, and in particular, for low emission or highly efficient engines.

SUMMARY OF THE INVENTION

The present invention provides an external combustion engine to convert the expansion force of a fluid vapor into mechanical force.

The present invention also provides a method of using existing internal combustion engine designs as a base for an external combustion engine.

Additional aspects and advantages of the present invention will become apparent in light of the present specification, including claims and drawings, or may be learned by practice of the invention as disclosed herein.

The foregoing and/or other aspects and utilities of the present invention may be achieved by providing an external combustion engine, including a fuel tank to store a fuel; a vaporizer to receive and combust the fuel, wherein an atomized liquid introduced into the vaporizer is turned into an expanding fluid vapor; an engine block to receive the expanding fluid vapor and convert an expansion force thereof into mechanical force; and a vaporizer exhaust system to direct at least a portion of the heat produced by the combustion of the fuel into passages defined in the engine block to shroud the engine block and heat the expanding fluid vapor therein.

In another embodiment, the atomized liquid, being a mixture of water and ammonia, comprises at least 50% water.

In another embodiment . . . the engine block is an internal combustion engine block and the flash vaporizer exhaust system directs the heat of the fuel combustion to at least one of coolant passages defined in the internal combustion engine block and other passages within the internal combustion engine block to shroud the internal combustion engine block with the heat of the fuel combustion.

In another embodiment, the conventional internal combustion engine block comprises at least one piston within a cylinder, the cylinder incorporating at least one groove connected to the original coolant passages, and wherein the cylinder is fitted with a shrouding sleeve to define other passages for the heat of the fuel combustion to shroud the piston.

In another embodiment, the fuel is a mixture of fuels and the fuel tank stores the mixture of fuels.

In another embodiment, the fuel includes at least one of a liquid fuel and a gaseous fuel.

In another embodiment, the fuel includes natural gas.

BRIEF DESCRIPTION OF THE DRAWINGS

These and/or other aspects and advantages of the present invention will become apparent and more readily appreciated from the following description of the various embodiments, taken in conjunction with the accompanying drawings of which.

Figure 1:
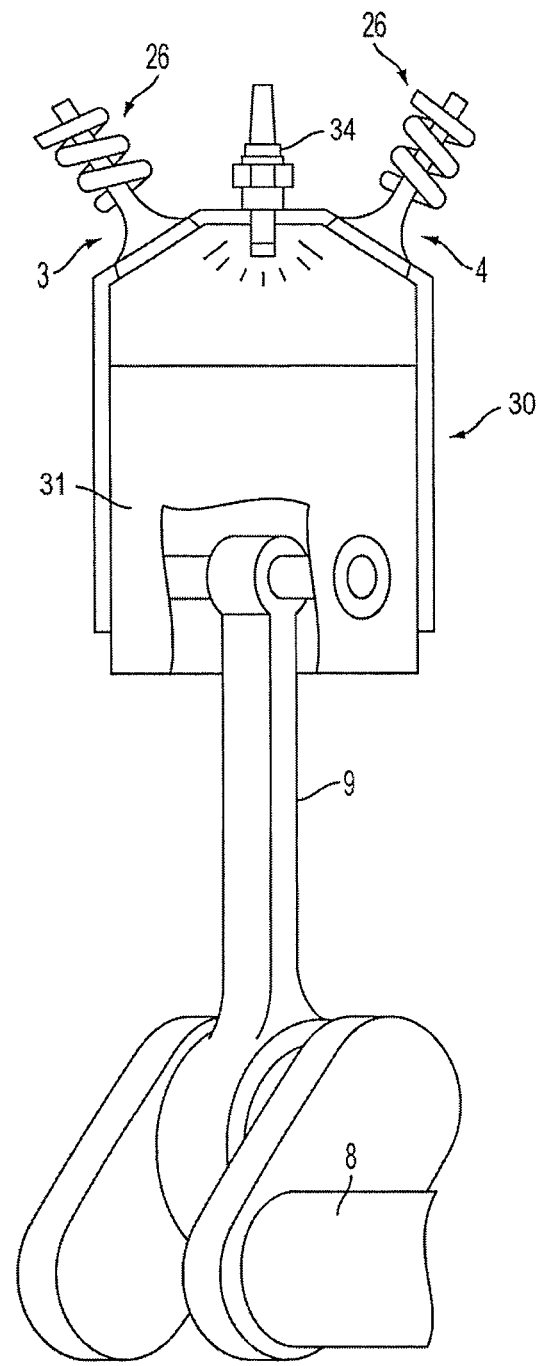
FIG. 1 illustrates a piston cylinder.

The drawings above are not necessarily to scale, with emphasis instead generally being placed upon illustrating the principles of the present invention. Further, some features may be exaggerated to show details of particular components. These drawings/figures are intended to be explanatory and not restrictive of the invention.

DETAILED DESCRIPTION OF THE PREFERRED EMBODIMENTS

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, "operationally coupled" means that there is a functional interaction between one or more components. For example, an engine control unit (ECU) may be operationally coupled to one or more actuated vapor injector (AVI), and by controlling a duration of actuated vapor injector opening, a power of an engine may be controlled by a volume of expanding fluid vapor introduced into a cylinder. Similarly, a sensor installed in an expanding fluid vapor condenser may determine that expanding fluid vapor is insufficiently cooled to return to a liquid state, as high density fluid, and so, may actuate a cooling fan to form a condensate. Multiple functions such as these may be controlled by the engine control unit, and may be included within the definition of operationally coupled.

Terms that are not otherwise defined herein are used in accordance with their plain and ordinary meaning in the English language or according to their use in trade. In the following detailed descriptions, numerous specific details are set forth in order to provide a thorough understanding of the present invention. However, it will be apparent to one of ordinary skill in the art that these specific details need not be all used to practice the present invention. In other circumstances, well-known structures, compounds, circuits, processes, interfaces, components, and methods have not been shown or described in detail in order not to unnecessarily obscure the present invention.

The present invention is directed to an external combustion engine and methods to convert internal combustion engine designs thereto. While some embodiments of the present invention use an internal combustion piston engine design as a basis to describe the invention, the present invention is not limited thereto and engines of the present invention may be based on other types of engines. For example, rotary, radial, turbine or other engine designs where a fuel is burned internally to produce mechanical power. Such internal combustion engines may include engines fueled by carbon based fuels, such as gasoline, diesel, kerosene, natural gas and other gaseous fuels.

A common form of internal combustion engine design is the four-stroke piston engine. As illustrated in FIG. 1, a four-stroke piston engine is characterized by four strokes, or reciprocating movements of a piston [31] within a cylinder [30] to impart mechanical movement of a crankshaft [8]. A four stroke cycle begins when the piston [31] is farthest away from the axis of a crankshaft [8], i.e. at its highest position within the cylinder [30]. On an intake or induction stroke, the piston [31] descends from the top of the cylinder [30], reducing a pressure inside the cylinder [30]. A mixture of fuel and air is drawn by the pressure reduction into the cylinder [30] through an inlet valve [3] port. The intake valve [3] then closes, and a compression stroke of the piston [31] ascending within the cylinder [30] compresses the fuel-air mixture. The air-fuel mixture is then ignited near the end of the compression stroke, usually by a spark plug [34] (for a gasoline or Otto cycle engine) or by the heat and pressure of compression (for a Diesel engine). The resulting pressure of burning gases pushes the piston [31] through the power stroke downward within the cylinder. In the exhaust stroke, the piston [31] ascends within the cylinder [30] to push the products of combustion from the cylinder through an exhaust valve [4]. The opening and closing of valves [3] and [4] (biased by springs [26]) are controlled by a camshaft, not shown.

Figure 2:
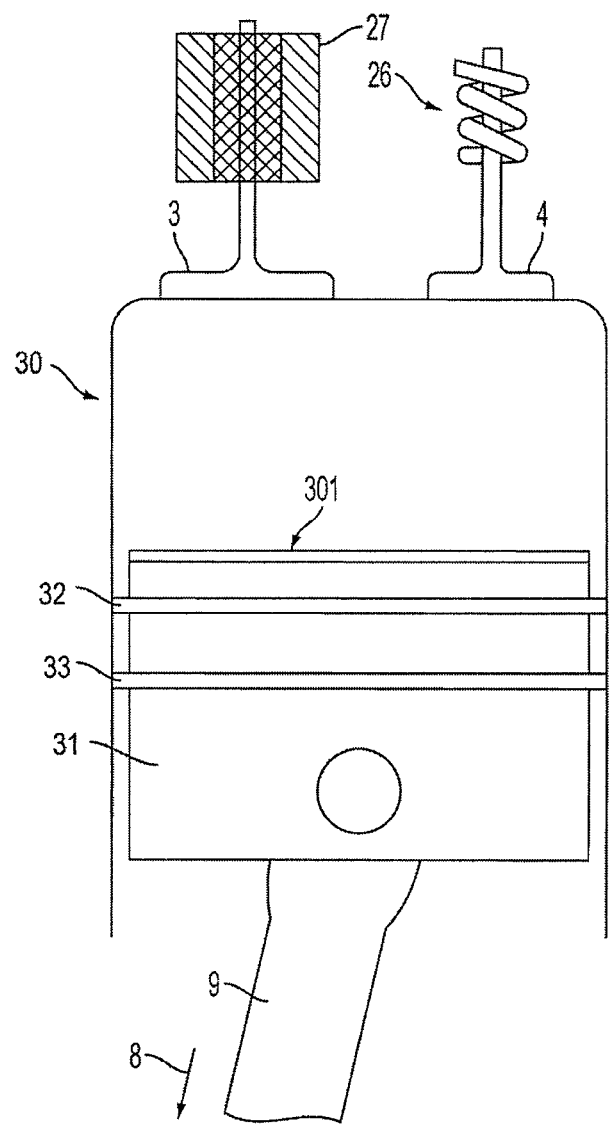
FIG. 2 illustrates a piston cylinder according to an embodiment of the present invention.
Figure 3:
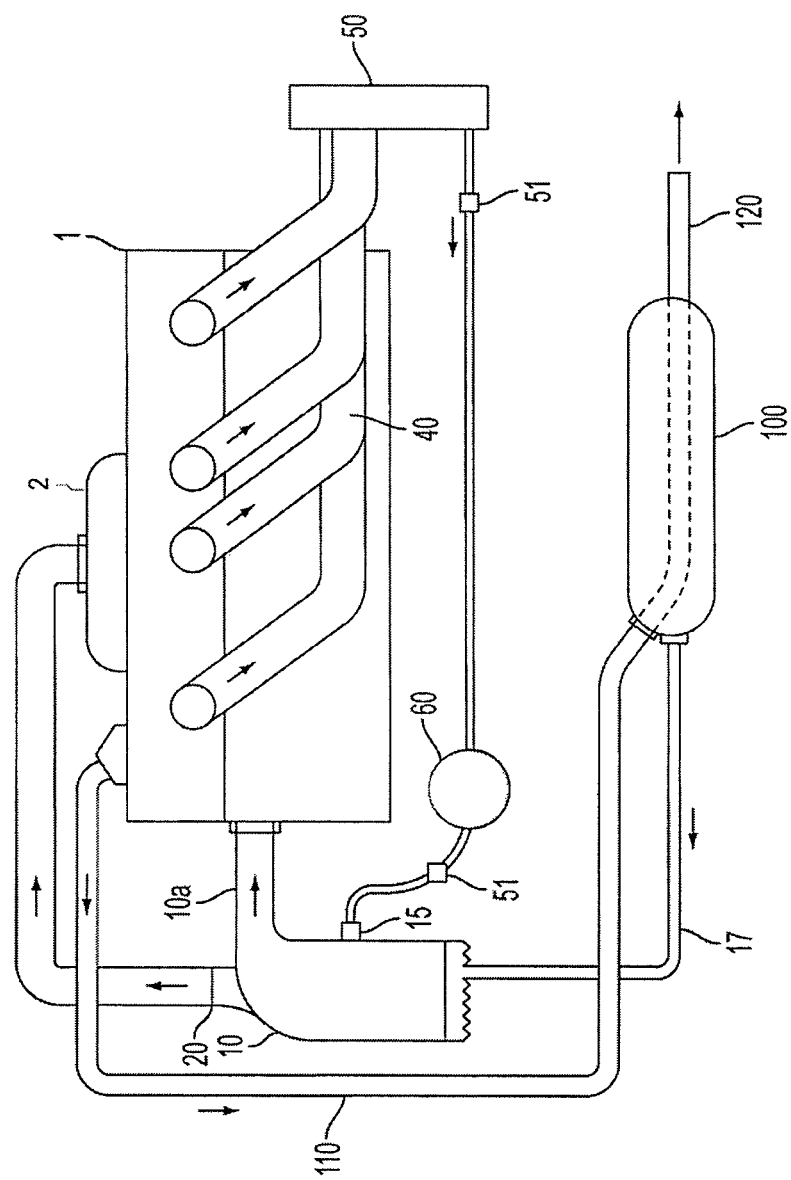
FIG. 3 illustrates an engine according to an embodiment of the present invention.

As illustrated in FIGS. 2 and 3, a conventional internal combustion piston engine design can be used to describe an engine under the present invention. In one embodiment, an engine operates in a two stage process whereby a high density fluid is heated through combustion of a fuel in a vaporizer to produce an expanding fluid vapor, and then the expanding fluid vapor is directed to a piston cylinder of an engine block to move a piston and produce mechanical force. Similarly, in other embodiments, the expanding fluid vapor is introduced into the rotary, radial, turbine engines to produce mechanical force.

The density fluid is selected to optimize its conversion from a fluid to a vapor. In one embodiment, the high density fluid may be a combination of 3 or more fluids. In another embodiment, the high density fluid may be a binary fluid of components having adjacent molecular weights in order to widen a temperature range for fluid conversion to vapor, in that fluids of similar molecular weight maintain a better continuity in the range of vaporization between the fluids combined in the high density fluid. For example, the high density fluid may be a binary mixture of ammonia and water. The molecular weight of ammonia is 17.0306 g/mol, and the molecular weight of water is 18.0153 g/mol. The water may be desalinated or distilled. The binary mixture may comprise about 5-50% ammonia and about 50-95% water, preferably about 10-50% ammonia and about 50-90% water. However, the present invention is not limited thereto, and the ratio between the binary components may vary from the percentages cited. For example, the percentage of ammonia in the high density fluid may vary according to a displacement size of the engine and performance applications. Ammonia may be selected as one binary fluid because ammonia is readily available at low cost, and has a low vaporization point. However, while the high density fluid described above includes a binary mixture of ammonia and water, the present invention is not limited thereto. The high density fluid may include the use of other binary fluids combined to have a wider range of vaporization temperature than a single fluid.

In other embodiments, the high density fluid may be a single liquid. An important characteristic of the high density fluid is an ability to minimize the effect of any variance in vaporizer temperature where vapor will continue to be produced and will not substantially affect a performance of the vehicle.

As illustrated in FIG. 3, an exemplary operating cycle for an engine according to an embodiments of the present invention is as follows: in the embodiment illustrated, an internal combustion piston engine [1] serves as a basis for the operation of the engine. The components of the engine can be adapted from a conventional internal combustion engine design, including, but not limited to, designs of the engine block [1], the crankshaft [8], connecting rods [9], and pistons [31].

Figure 4:
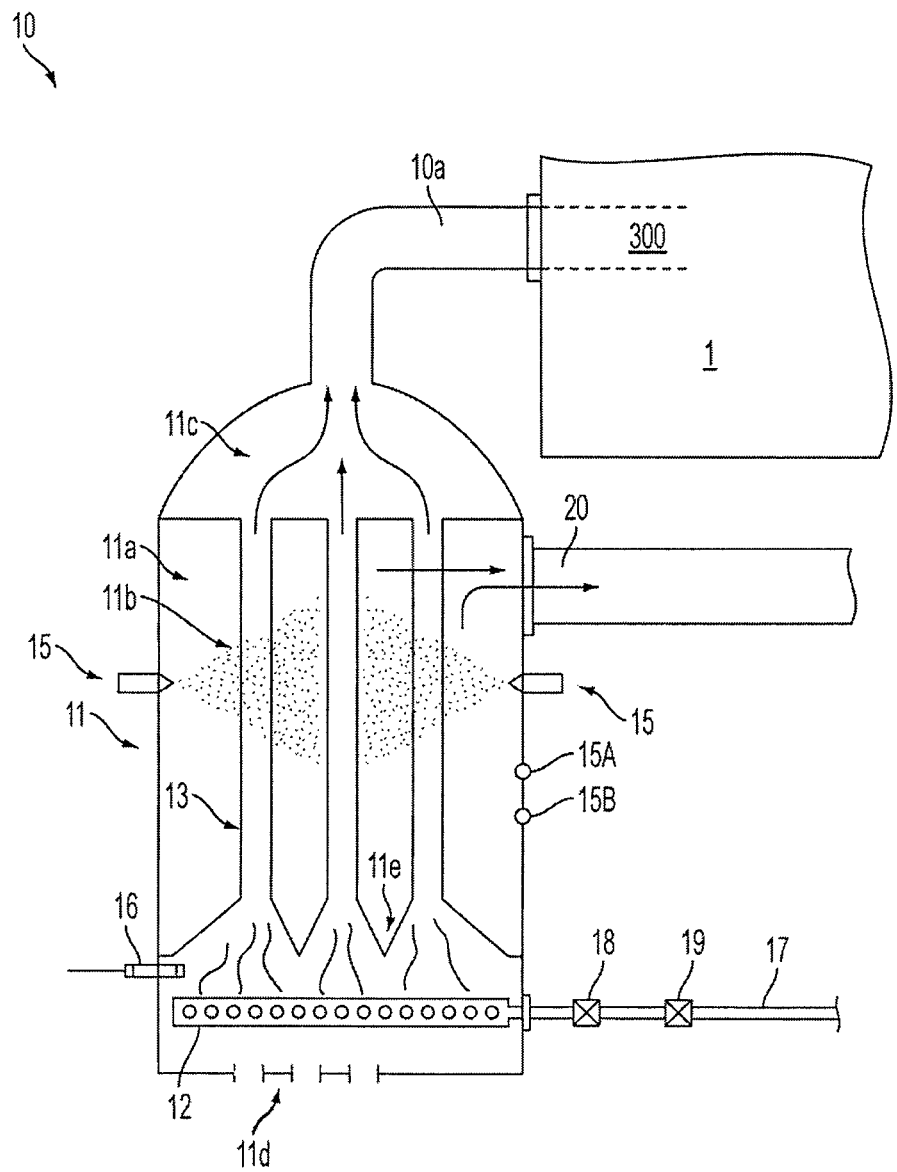
FIG. 4 illustrates a flash vaporizer according to an embodiment of the present invention.

In FIG. 3, a liquid or gaseous fuel is supplied by a fuel tank [100] to a flash vaporizer [10]. The supply of fuel may be regulated mechanically and/or electronically by an operationally coupled engine control unit (ECU) (not illustrated). For example, the fuel supply can be regulated by a fuel volume regulator [18] as illustrated in FIG. 4.

Fuel from the fuel tank [100] is carried to the flash vaporizer [10] by fuel line [17] where it is ignited. The flash vaporizer [10] includes a burner [12] positioned and designed in such a manner that the heat conveyed from burner [12] increases the temperature of the high density fluid (separately introduced into the flash vaporizer [10]) to form an expanding fluid vapor.

The expanding fluid vapor formed in the flash vaporizer is conveyed to the engine cylinder(s) [30] inside the engine block [1] via the expanding fluid vapor outlet [20]. If the engine includes actuated vapor injectors, the actuated vapor injectors are mechanically or electrically actuated to convey the expanding fluid vapor to the engine cylinder(s) [30] to create mechanical motion in the engine. The actuated vapor injectors may be controlled and/or operationally coupled in a manner that will affect engine rotational speed, engine power output, and engine rotational direction.

The introduction of expanding fluid vapor into the engine imparts mechanical movement in the piston(s) [31], and said movement may be conveyed by mechanical motion of a vehicle or device thereby attached to perform a function as determined by the operator.

In one embodiment, the high density fluid is introduced as an atomized liquid into a high density fluid heating chamber [11a] in the flash vaporizer [10]. When the atomized fluid contacts superheated internal surfaces forming the high density fluid heating chamber [11a] as further described below in connection with FIG. 4, the atomized liquid is vaporized, thereby expanding in volume, for example, in the range of approximately 2000:1. The resultant expanding fluid vapor is then be held under pressure in an intake manifold [2] and/or in the flash vaporizer [10]. Alternatively, the flash vaporizer [10] and the components leading to the intake valve [3] or cylinder [30] actuated vapor injector may be pressurized. This maximizes an available volume of pressurized expanding fluid vapor available to the engine so that the expanding fluid vapor pressure is not rapidly drawn down when the rotational speed of the engine is increased rapidly. The intake manifold [2] or the flash vaporizer [10] may be electronically or mechanically actuated and/or operationally coupled to the engine control unit to direct and meter expanding fluid vapor to the engine when the rotation of the engine is mechanically determined to cause mechanical motion by movement of the piston [31], or similar engine components.

In one embodiment, the expanding fluid vapor is then discharged from the engine block [1] through an exhaust manifold [40] and collected in a condenser [50] which condenser cools the expanding fluid vapor to a condensation temperature and condenses the expanding fluid vapor back into liquid high density fluid. The high density fluid is then collected in a reservoir [60], whereupon it is pumped by a high density fluid pump [51] under pressure to a high density fluid regulator [15] to be reintroduced into the flash vaporizer [10] for reuse as a high density fluid in a closed circuit manner.

Expanding fluid vapor operating pressure can be maintained under varying load and operating conditions according to the volume of high density fluid introduced into the flash vaporizer [10] and/or the volume of fuel introduced into the flash vaporizer burner [12]. For example, a high pressure could be attained by introducing a high volume of fuel and a high volume of high density fluid into the flash vaporizer [10], while a low pressure could be maintained by minimizing the amount of fuel and minimizing the volume of high density fluid introduced into the flash vaporizer [10]. Control of the engine in the intermediate operating cycles may be performed by monitoring the expanding fluid vapor pressure in the manifold [2] or the flash vaporizer [10] prior to release of expanding fluid vapor into the engine block [1], and maintaining said pressure. In one embodiment, a startup cycle of the engine may be optimized through the rapid heating of the flash vaporizer [10] and the conversion of low volume atomized high density fluid into high volume expanding fluid vapor.

External combustion of the fuel in the flash vaporizer [10] can maximize a combustion efficiency of the engine and deliver operating characteristics consistent with extended engine life, greater horsepower and torque at lower RPM. External combustion of the fuel may also eliminate complex combustion control and emission devices associated with combustion of the fuel within the cylinders of a conventional internal combustion engine.

In one embodiment, an efficiency of the engine can be enhanced by maintaining an optimal stoichiometric ratio of air to fuel through a wide range of operating conditions. By comparison, a conventional internal combustion engine design may intake the same amount of combustion air in a cylinder, regardless of operating conditions or fuel volume, thereby operating inefficiently outside the internal combustion engine stoichiometric ratio. In addition, in another embodiment, the pressure on an engine piston can be controlled such that maximum pressure can be made against the piston at low revolutions per minute (typically 500 RPM) thereby reducing engine wear and increasing longevity of the engine compared to conventional internal combustion engine designs which maximize power at 5,000-6,000 RPM. This low RPM, high power characteristic, also manifests itself as a quicker throttle response time than a conventional internal combustion engine design. In other embodiments, external combustion of the fuel isolates non-combusted fuel outside of the cylinder, unlike in conventional internal combustion engine designs where non-combusted fuel moves past the piston rings to contaminate the lubricating oil, and where the gasoline or diesel fuel dissolves the lubricating oil, thus, increasing engine wear and potential engine failure. In addition, in some embodiments, the engine has no combustion air contaminants entering the cylinder, unlike an internal combustion engine which must filter the air of contaminants so as not to damage the cylinders or contaminate the lubricating oil, both problems which are avoided by engines according to embodiments of the present invention. In one embodiment, when fueled by hydrogen, the hydrogen combusted in the flash vaporizer forms water when it reacts with oxygen present in the air to create a zero-carbon exhaust. The use of hydrogen as the fuel can eliminate most if not all of the anti-pollution emissions devices associated with carbon based gasoline or diesel internal combustion engines whereby carbon derived pollutants must be reduced due to the inherent chemical composition of a carbon based fuel. The result is an improved performance in the engine, and reduced manufacturing cost due to the elimination of internal combustion engine combustion and emission control devices. However, the present invention is not limited thereto, and other fuels may be used in the flash vaporizer. For example, the flash vaporizer [10] may operate with gaseous fuels, such as compressed natural gas, propane, or methane; liquid fuels, such as gasoline, diesel, JP-8, or alcohol. In some embodiments, the choice of fuel may require the use of a vaporizer nozzle (not illustrated) adjacent to the burner [12] to vaporize the liquid fuel prior to combustion.

As described above with respect to FIGS. 2-3, in some embodiments, components of the engine can be adapted from a conventional internal combustion engine designs, including, but not limited to, the engine block [1], the crankshaft [8], connecting rods [9], and pistons [31].

For example, conversion of a conventional engine design to an engine according to an embodiment of the present invention, may include: removal of the conventional fuel tank and fuel lines in the internal combustion engine; removal of unused internal combustion engine components, such as attached control devices, sensors, ignition system, electronics, fuel supply, cooling system, and selected exhaust components; installation of the fuel tank [100] and installation of engine fuel lines [17]; installation of the flash vaporizer [10] and related components, such as, flash vaporizer venting, throttle controls, monitoring gauges as applicable; installation of an expanding fluid vapor recovery system as applicable, including a high density fluid condenser [50], a high density fluid reservoir [60], and a high density fluid pump [51]; and installation of an engine control unit, if used, with related sensors and other components.

Fuel tank [100] may include any container suitable to store and/or supply the fuel selected for the engine. For example, when hydrogen is selected as the fuel, a hydrogen fuel tank [100] may have a sensor(s) installed so as to determine and make known the amount of available hydrogen fuel therein. The hydrogen fuel tank [100] may have a valve(s) of such electrical or mechanical design so as to be filled and refilled and/or to shut-off or turn-on the supply of hydrogen to the hydrogen flash vaporizer. The hydrogen fuel tank [100] may be of such design as to safely avoid physical damage, corrosion, or other compromise of its structural integrity. The hydrogen fuel tank [100] may be controlled by or otherwise operationally coupled to the engine control unit. The hydrogen fuel tank [100] may be a tank for storing compressed hydrogen, liquefied hydrogen, metal hydride, borohydride, alanate, or any other hydrogen source and storage container as known in the art.

Three common ways to store hydrogen fuel in a tank is as a compressed gas at 5,000 psi, liquefied at −400° F., or in a hydride. For safety, cost, ease of manufacturing, and increased volume of storage, hydride storage tanks are beginning to dominate the industry. In these hydride tanks, hydrogen is combined with different metals to form inert molecules. To release the hydrogen, the hydride must be heated. This is a problem for hydrogen fuel cells as their exhaust is low-grade heat and cannot activate the hydrogen release. Similarly, internal combustion of hydrogen at 550° C. is too hot to release in the hydride tank in a controlled manner. In one embodiment of the present invention, a high-grade exhaust of the engine, which may be at 100-125° C., is routed through a hydride tank [100] to release hydrogen for fuel and combustion. This is a highly efficient use of the hydrogen combustion heat, as other conventional hydrogen engines are limited to generating heat separately to release hydrogen from a hydride tank during engine operation.

To heat the hydride tank [100] to release the hydrogen, the exhaust [10 a] from the hydrogen flash vaporizer [10] can be routed by an exhaust pipe [110] to one end of the hydride tank [100]. The exhaust pipe [110] may penetrate the hydride tank [100] and divided into a plurality of smaller pipes routed at equidistant spacing throughout the length of the hydride tank [100]. The smaller pipes may then be collected at the opposing end of the hydride tank [100], connected to another pipe which also penetrates the hydride tank [100], and thereafter exhausted to the atmosphere through a discharge pipe [120]. The dissipation of the heat throughout the hydride tank [100] at a minimum of 100° C. is sufficient to heat the hydride stored therein and cause release of the hydrogen fuel during engine operation. The hydride tank [100] may be fixed in the engine and refilled with hydrogen once depleted of hydrogen. A system to initiate hydrogen release, such as a start-up heater, may be included to release hydrogen from the hydride tank [100] prior to full engine operation.

An example of a flash vaporizer according to an embodiment of the present invention is illustrated in FIG. 4. The flash vaporizer allows rapid generation of expanding fluid vapor in the engine, and thus, improves the rapid availability of power to the engine. A flash vaporizer does not operate like a conventional boiler which introduces a liquid into a vessel, heats it slowly until it boils, and only then creates an expanding vapor. Instead, the liquid is sprayed, for example by atomization, into the flash vaporizer where upon contact with superheated (about 550° C.) surfaces it instantly vaporizes and expands significantly to expanding fluid vapor (For example, by about 2000:1 by volume). The flash vaporizer is highly efficient because the mass of liquid to be heated is minimal, and a superheated surface area of the vaporizer greatly exceeds the contact area of the liquid as compared to a boiler.

In one embodiment, the flash vaporizer may be of such material, design and function as to ignite the fuel and vaporize the high density fluid so as to form expanding fluid vapor. For example, the flash vaporizer may be fabricated from stainless steel. FIG. 4 illustrates a flash vaporizer [10] according to an exemplary embodiment of the present invention. As illustrated in FIG. 4, the flash vaporizer [10] is connected by a fuel line [17] to facilitate the movement of fuel from the fuel tank [100] to the flash vaporizer [10]. The flash vaporizer [10] as illustrated includes a flash vaporizer body [11], a burner [12], and a plurality of heating tubes [13]. The flash vaporizer body [11] defines high density fluid heating chamber [11a], a combustion chamber [11b], and an exhaust [11c]. The heating tubes [13] may be hollow and may be disposed within the heating chamber [11a] to connect the combustion chamber [11b] to the exhaust [11c]. The burner [12] is disposed in the combustion chamber [11b] to combust the fuel and heat an inside surface of the heating tubes [13]. An air intake [11d] is provided in the combustion chamber [11b] to combine air with the fuel during a combustion thereof. In one embodiment, ambient air provides combustion air and ensures combustion of the fuel, thereby efficiently extracting, by maintaining the optimal stoichiometric ratio of combustion throughout all load and fuel volume variations, a greater amount of energy from the combustion of the fuel than if air supply was restricted. The heated air from combustion travels through the heating tubes [13] to the exhaust [11c]. The cross-sectional area of the exhaust [11c] may be dimensioned to equal or exceed a combined cross-sectional area of the heating tubes [13] to prevent a constriction of the heated air flow. The flash vaporizer [10] is shown including a fuel igniter [16] to initiate the combustion of fuel. The flash vaporizer [10] includes a fuel-off and fuel-on function, such as a shut-off valve [19], as well as variable fuel volume regulator [18]. The flash vaporizer [10] may have a regulator [15] to regulate the introduction of high density fluid in a volume suitable for engine operation, as well as sensor(s) [15a-15b] to determine the volume of high density fluid in the flash vaporizer, a sensor to monitor the volume of expanding fluid vapor to the actuated vapor injector(s), and a safety sensor(s) to monitor the flash vaporizer [10] functionality. The high density fluid is intro into the flash vaporizer [10] as, for example, a stream of liquid splashed among the heating tubes [13] or by atomizer through the regulator [15] to contact the heating tubes [13] as an atomized fluid. Because the heating tubes [13] are tapered at a bottom portion thereof, any high density fluid which does not immediately vaporize may be collected inside of the heating chamber [11b] in an area between the heating tubes [13] at a v-shaped collection point [11e]. The collection point [11e] may be disposed closest to the burner [12], and therefore may be the hottest point of the flash vaporizer [10]

capable of vaporizing the collected high density fluid in the least amount of time. In one embodiment of the present invention, the high density fluid is introduced into the heating chamber [11b] as an atomized liquid. Upon contact with the heated heating tubes [13], the high density fluid vaporizes and expands to form expanding fluid vapor. The flash vaporizer body [11] includes an expanding fluid vapor outlet [20] to supply expanding fluid vapor to the pistons [31] in the engine block [1]. In one embodiment, the flash vaporizer [10] has provision for high density fluid condensate to be re-introduced to the engine in a closed-loop operation. Alternatively the high density fluid may be introduced to the engine and not recovered by a condenser [50]. As illustrated in FIG. 4, a bottom portion of the heating tubes [13] may be tapered to increase a surface contact area of the combusting fuel and define the collections points [11e] to accelerate the vaporization of collected high density fluid.

The expanding fluid vapor generated in the flash vaporizer [10] is conveyed to the engine cylinders [30] or actuated vapor injector(s) through the expanding fluid vapor outlet [20]. The expanding fluid vapor outlet [20] may be a tube of such volume, shape, design, insulation and material so as to contain the expanding fluid vapor in a state which may be consistent with the expanding fluid vapor produced in the flash vaporizer [10]. For example, the expanding fluid vapor outlet [20] may be a stainless steel tube. Said tube may be of such design so as to incorporate a manifold to facilitate the flow of expanding fluid vapor to multiple actuated vapor injector locations or cylinders in particular embodiments. Heat loss in said tube may be mitigated by the use of insulation or short tubing.

As described, the expanding fluid vapor may be introduced to the engine cylinders [30] through the use of an actuated vapor injector(s) which may be either electrically or mechanically controlled.

Figure 5:
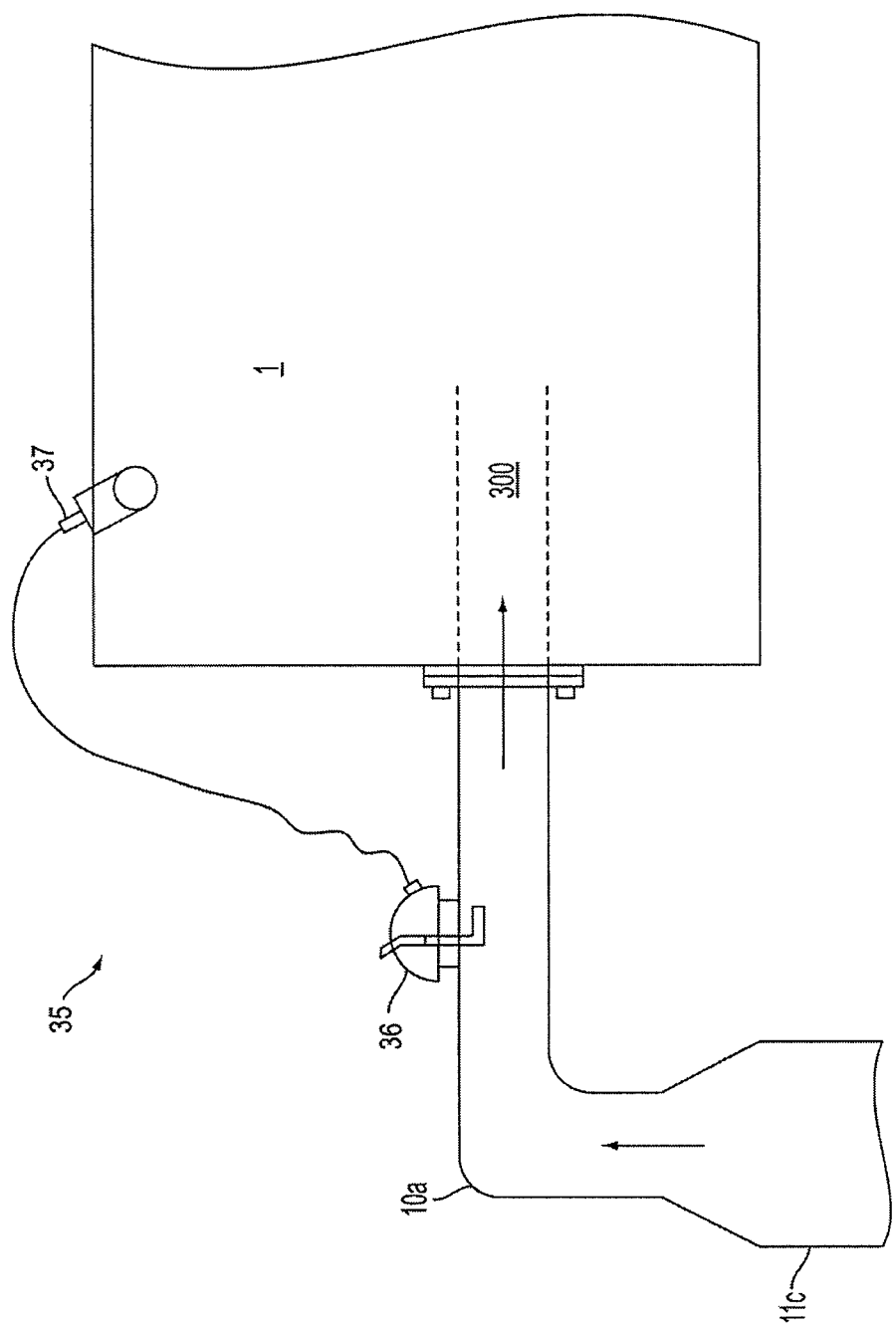
FIG. 5 illustrates a heat director according to an embodiment of the present invention.

The flash vaporizer [10] may also regulate an introduction of high density fluid into the flash vaporizer [10] to control mechanical operation of the engine. An exhaust [11c] of the flash vaporizer [10] is shown positioned to exhaust toward engine block [1] to facilitate the heat shrouding of the engine block cylinders [30]. As illustrated in FIG. 5, in one embodiment, in order to regulate a temperature of the combusted fuel exhaust, the flash vaporizer [10] is shown including an ambient air bleed valve [35] so as to direct cooler ambient air into the combustion exhaust, to blend with, and cool the combustion exhaust prior to entering the engine block [1] to prevent overheating.

The ambient air bleed valve [35] comprises a valve [36] and a temperature sensor [37] operationally coupled to the valve [36]. The valve [36] may be electronically or mechanically activated to control the temperature of the exhaust heat introduced into the engine block [1] so as to be within the metallurgy limitations of the engine block [1]. The temperature sensor [37] may monitor a temperature of the engine block [1] and may directly activate the valve [36]. Alternatively, sensor [37] may be operationally coupled to an engine control unit of the engine, wherein the engine control unit controls valve [36].

While for purposes of efficiency and heat-shrouding, the flash vaporizer [10] uses hydrogen as a fuel, the present invention is not limited thereto and the flash vaporizer [10] may operate with other fuels. For example, gaseous fuels or liquid fuels. However, embodiments using carbon-based fuels may need to account for the radiant heat factor of the fuels to prevent the exhaust heat of a carbon fuel combustion from affecting the engine block [1].

Figure 11:
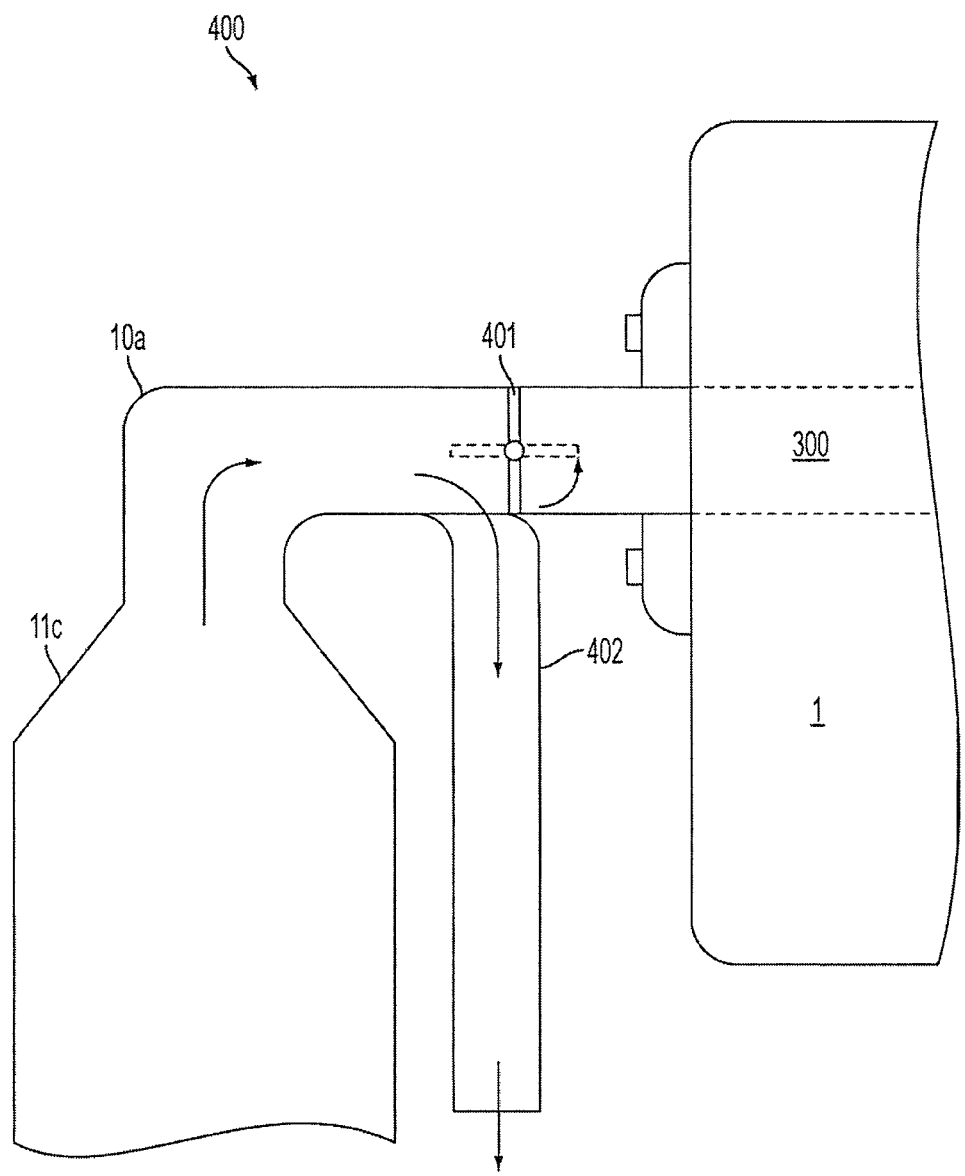
FIG. 11 illustrates a vaporizer exhaust bypass according to an embodiment of the present invention.

As illustrated in FIG. 11, the engine may include a vaporizer exhaust bypass [400]. The vaporizer exhaust bypass [400] may include a bypass valve [401] and a discharge exhaust [402]. The bypass valve [401] may be disposed in expanding fluid vapor outlet [20] and may be electronically or mechanically activated to direct a vaporizer exhaust away from the engine block [1] and into the discharge exhaust [402]. As illustrated in FIG. 11, the bypass valve [401] may include a diverter plate to selectively allow passage of the vaporizer exhaust into the engine block [1] or to block passage of the vaporizer exhaust into the engine block [1] and instead direct the vaporizer exhaust into the discharge exhaust [402]. The discharge exhaust may exhaust the vaporizer exhaust directly to the atmosphere. Alternatively, the engine may include conventional internal combustion engine exhaust components connected to the discharge exhaust [402] to reduce the emissions of a carbon based fuel exhaust. The addition of the vaporizer exhaust bypass [400] gives the engine a dual fuel capability, where an amount of heat produced by the combustion of fuel within the flash vaporizer exhaust, used to thermally shroud the engine block cylinders [30], can be controlled according to the fuel used. For example, when hydrogen is the fuel, a greater amount of exhaust heat can be directed to the engine block [1]. In another embodiment, the amount of vaporizer exhaust heat supplied to the engine block [1] can be reduced according to the radiant heat of the fuel to prevent warping or damage to the engine block [1]. Accordingly, the engine under the present invention may be embodied as a multi-fuel engine, providing additional versatility to the engine, especially for remote or military applications where hydrogen fuel may not be available. For example, in some embodiments, the fuel may be a mixture of one or more fuel types. In one embodiment, the unlimited air available for the fuel combustion allows attainment of an adequate stoichiometric ratio for each fuel component in the fuel.

The high density fluid reservoir [60] may be such volume, shape, and design that it provides for the operation of the engine in either the vented or condensate application as intended. Said high density fluid reservoir [60] may be equipped with a sensor to measure the volume content of high density fluid within the high density fluid reservoir [60], a one-way valve which may be installed either at the entry or exit of the high density fluid to the high density fluid reservoir [60], as well as a pump [51] to move high density fluid through a tube of such design as to introduce high density fluid to the flash vaporizer [10]. The high density fluid reservoir may be equipped with a fill opening which may be selectively sealed if not in use. The high density fluid reservoir [60] and the condenser [50] may be operationally coupled to the engine control unit.

Fuel combustion and power output of the engine may be controlled by the engine control unit with input from an operator and information provided by sensors on the engine.

The engine control unit may monitor fuel storage, availability, and demand, control the rate of fuel combustion, control expanding fluid vapor supply to each cylinder [30], ambient temperature, cylinder temperature, piston speed, adjust to the working load on the engine, maintain a fixed rotating speed, and provide the startup ignition cycle as well as turn the engine off. The engine control unit may be connected to, and controlled by, an external computing device such as a laptop computer to optimize or vary engine performance.

In certain embodiments, engine mechanical devices (EMD) may supplement or replace the functions of the engine control unit which may not have a direct correlation in the degree of control efficiency.

In embodiments of the present invention utilizing an engine control unit, the engine control unit may be coupled to an ambient air temperature sensor, a throttle position sensor, a flash vaporizer fuel igniter, a fuel volume valve, a pressure sensor, a flash vaporizer temperature sensor, a high density fluid temperature sensor, an expanding fluid vapor temperature sensor, an expanding fluid vapor injector actuator, an engine rotating speed sensor, and/or an engine cylinder temperature sensor. These sensors may be conventional internal combustion sensors adapted to engine use, or may be new sensors installed specifically with the engine.

When an expanding fluid vapor condenser [50] is used with the engine, the engine control unit may also incorporate a condensate temperature sensor, a cooling fan actuating sensor, and a recirculating pump actuation sensor. An electronic interface with the engine control unit may be comprised of or be operationally coupled to a thermally insulated housing, sensor multitap, a power source, modem with access hardware and software, or RJ-11 connectors which may utilize a DragonBall, StrongArm, Motorola, or any other processing chip known in the art.

According to the present invention, operational controls may be mechanically operated or used in conjunction with the engine control unit in respect to the actuation, monitoring, and operation of the engine, in any combination therein without restriction or constraint in design. The expanding fluid vapor injectors may be actuated by a mechanical attachment to engines pulleys, belts, or timing wheels of the engine. Engine cylinder and other temperatures may be monitored by a mechanical or electronic gauges independent of an engine control unit. The throttle may have a mechanical position locater.

The present invention may further include programming the engine control unit by a remote method using a CPU laptop, or central computer reached by modem. Alternately the engine may have various pre-programmed control programs or chips for a common set of vehicles that may be loaded or inserted in a standardized engine control unit. As well alternately, a universal chip may be installed on an engine control unit which allows for selection of vehicle engine control unit standard operating or application specific operating profiles. The present invention may further include attaching a CPU to various sensors and components of the engine for testing, calibration, or operation either individually or in combination.

The engine control unit may be connected to sensors and regulators in a manner to provide for engine control and safety. Sensors connected to the engine control unit may be used to determine fuel volume, fuel pressure, ambient air temperature, fuel ignition temperature, fuel combustion exhaust temperature, throttle position, crankshaft position, flash vaporizer heating chamber temperature, flash vaporizer heating chamber minimum and maximum fill levels, high density fluid pump activation to the flash vaporizer, actuated vapor injector temperature sensor(s), condenser temperatures sensor(s), and actuated vapor injector pressure sensor(s). The engine control unit may control the flash vaporizer fuel input, the high density fluid pump to introduce high density fluid to the flash vaporizer [10], the activation of the actuated vapor injector for timing and duration of introducing the expanding fluid vapor to the cylinder(s) [30], activation of condenser cooling fan, activation of condenser high density fluid flow valves, activation of condenser high density fluid pump [51] to the high density fluid reservoir [60], and safety shut off valves in various locations. The engine control unit may be of a type and manufacture which may be operationally coupled to an external electronic device which may vary and/or set the operational functions of the engine control unit. Alternative configurations of the engine control unit may contain different components which may be of use in the disclosed apparatus, kits and methods and that any engine control unit in the art may be used within the scope of the claimed invention. In various embodiments the engine control unit may be installed in the engine or passenger compartment of the transportation vehicle. The engine control unit may have alternate operating programs installed within for selection by the operator for various common applications, or a chip containing operating programs for a particular application, or a chip which may be programmed from an external source may be in an embodiment either singularly or in combination. The engine control unit may have the provision for an external detachable electrical attachment of such design so as to externally provide a connection for the provision of receiving sensor input, control the regulators, and diagnose individual functionalities of the engine.

FIGS. 6A-6B, 7A-7B, and 8A-8B illustrate exemplary embodiments of the present invention using conventional internal combustion engine designs to form engines. While the embodiments described below are directed to an internal combustion piston engine design, the present invention is not limited thereto. Instead, the present invention includes all variants of internal combustion engine designs, including piston, radial, rotary, turbine and others in the art whereby a carbon based fuel is intended to be burned internally to produce mechanical power.

Figure 6A:
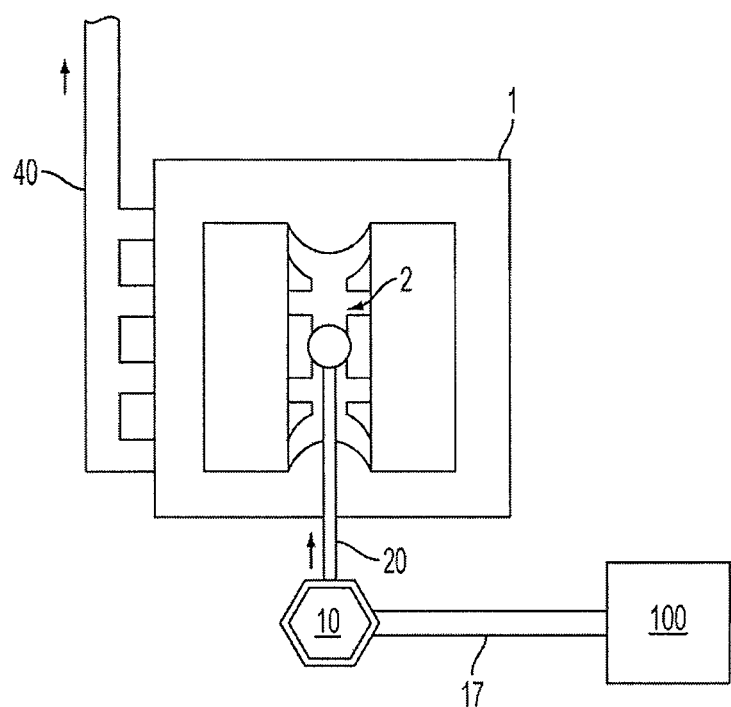
FIGS. 6A-6B, 7A-7B, and 8A-8B illustrate engines according to embodiments of the present invention.
Figure 6B:
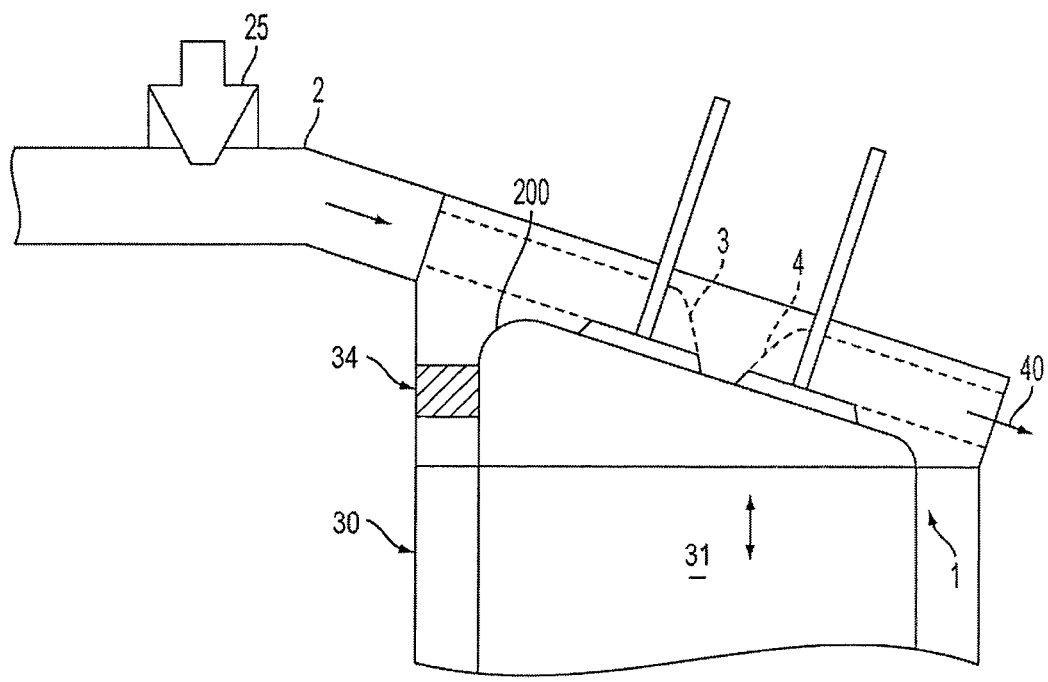

FIGS. 6A-6B illustrate an engine according to an embodiment of the present invention. In the embodiment illustrated in FIGS. 6A-6B, internal combustion engine components retained for conversion to an external combustion engine design include, but are not exclusive of, the following: the engine block [1], crankshaft [8], bearings and caps to secure the crankshaft [8] to the engine block [1], connecting rod(s) [9] with cap(s) and bearings to secure the connecting rod(s) [9] to the crankshaft [8], piston(s) [31] with wrist pins, retainers and rings [32-33] to secure the piston(s) [31] to the connecting rod(s) [9] and seal the piston(s) [31] within the cylinder wall, camshaft(s) actuated either by belt, gear(s) or other attachment to the crankshaft [9], cylinder head(s) complete with rocker arms, valves, springs push rods, or electronic actuators on the internal combustion engine, as well as an intake manifold [2].

In the embodiment illustrated in FIGS. 6A-6B, fuel is provided to a flash vaporizer [10] through a fuel line [17]. A high density fluid may be heated through combustion of the fuel in the flash vaporizer [10] to produce an expanding fluid vapor. The expanding fluid vapor may be metered directly into the intake manifold [2] which is sealed by a plate [200] of such design which may be in the location of the internal combustion engine carburetor or fuel injection throttle body so as to enable the intake manifold [2] to be pressurized by the expanding fluid vapor and direct the expanding fluid vapor to the cylinders [30]. As illustrated in FIG. 6B, the camshaft(s) may be designed so as to actuate an intake valve [3] and an exhaust valve [4] in either a two, three, or four stroke configuration for the intake of expanding fluid vapor from the intake manifold [2] to the cylinder(s) [30], and exhaust the expanding fluid vapor from the cylinders [30] to an exhaust manifold [40]. The expanding fluid vapor introduced into the cylinder [30] pushes the piston [31] housed therein to produce mechanical movement, such as turning the crankshaft [9]

connected to the piston [31]. In this embodiment, the spark plug hole(s) [34] may be sealed in a manner so as to enable the cylinder [30] to be pressurized by expanding fluid vapor. The expanding fluid vapor may be exhausted through the exhaust valve [4] into the exhaust manifold [40].

The embodiment illustrated in FIGS. 6A-6B utilizes a number of internal combustion engine design components, which, although may not be specifically engineered for the purpose used herein, may be readily adapted to use in the external combustion engine design. For example, as illustrated in FIG. 2, enhanced or double springs [27] may replace the stock springs [26] in the valve assembly to contain the expanding fluid vapor pressure prior to the valve being actuated.

Figure 7A:
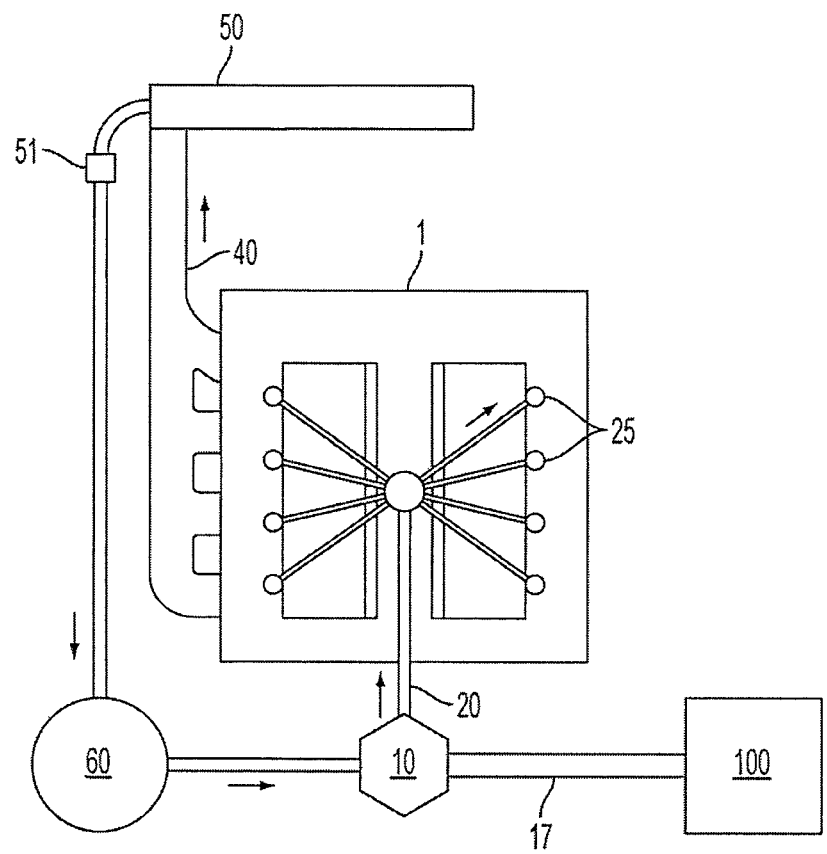
Figure 7B:
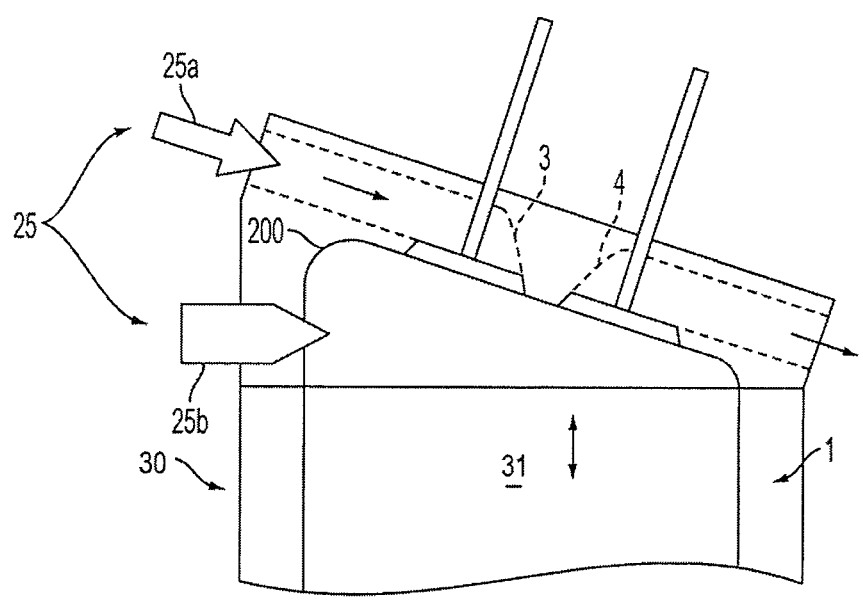

FIGS. 7A-7B illustrate a engine according to another embodiment of the present invention. In the embodiment illustrated in FIGS. 7A-7B, the internal combustion engine intake manifold [2] is removed. The spark plug(s) [34] are replaced by a plurality of actuated vapor injector(s) [25b] to introduce expanding fluid vapor into the cylinder(s) [30]. The actuated vapor injector(s) [25b] may be controlled either electronically or mechanically. Here, the intake valve [3] may not be actuated, while the camshaft(s) may be designed or modified to only actuate the exhaust valve(s) [4] in two, three or four stroke configuration.

Alternately, gasoline, diesel or gaseous carbon fuel injector(s) may be replaced by actuated vapor injector(s) [25a] in direct injection internal combustion engines whereby the spark or glow plug locations [34] may also be sealed (see FIG. 6B), and the introduction of expanding fluid vapor into the cylinder [30] can be operationally controlled by the actuated vapor injector(s) [25a]. Similarly, in internal combustion engine designs where the fuel injectors are mounted in the intake manifold [2] or the cylinder head behind an internal combustion intake valve [3], then the internal combustion engine cylinder head may be sealed where it may normally be attached to an internal combustion intake manifold so as to enable pressurization upon the introduction of expanding fluid vapor by actuated vapor injector(s) to the engine. There, the camshaft may either actuate the intake valve(s) (3) or may not be an operating component of the engine.

In certain embodiments of the reciprocating piston variants, the actuated vapor injector(s) may introduce expanding fluid vapor through either electronic or mechanical actuation so that it may optimize the operation of the engine in regard to performance, and may be operationally coupled to the engine control unit.

For example, as illustrated in FIG. 7A, the engine design conversion also includes an expanding fluid vapor condenser [50]. expanding fluid vapor in the exhaust manifold [40] is directed to the condenser [50]. The expanding fluid vapor is condensed back into high density fluid in the expanding fluid vapor condenser [50] and directed to a high density fluid reservoir [60]. A high density fluid pump [51] may be included to direct the high density fluid from the expanding fluid vapor condenser [50] to the high density fluid reservoir [60]. The high density fluid reservoir [60] supplies high density fluid to the flash vaporizer [10].

Figure 8A:
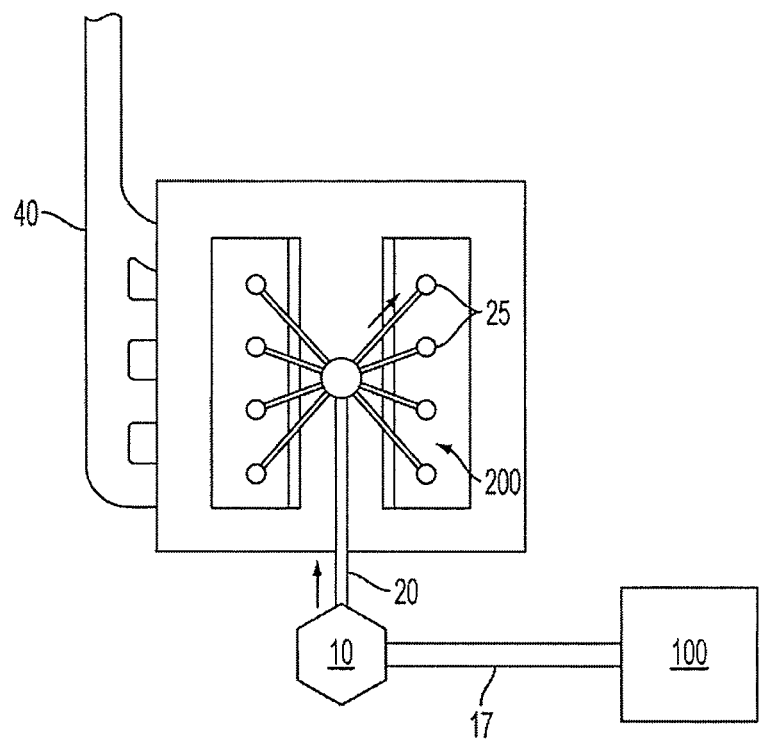
Figure 8B:
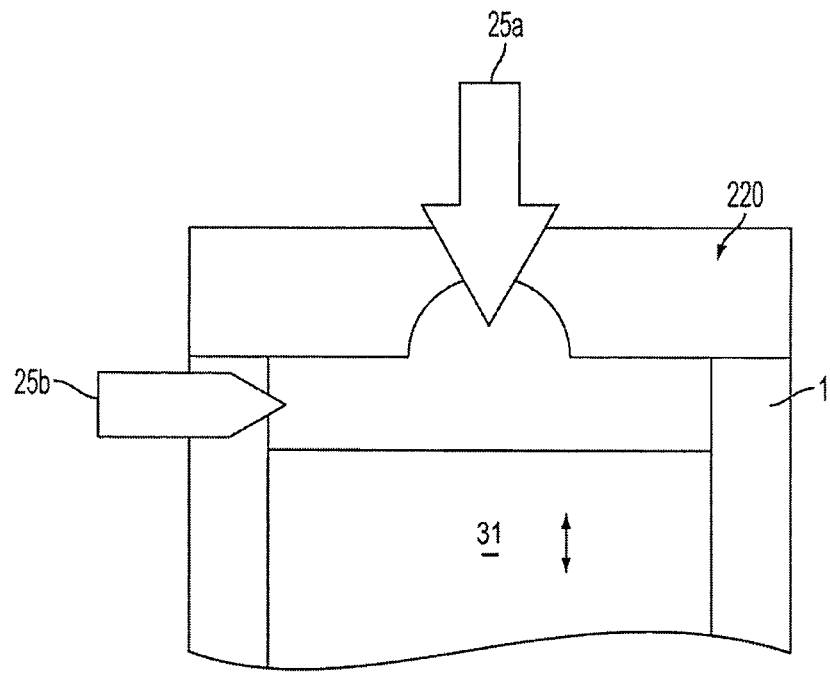

FIGS. 8A-8B illustrate an engine according to another embodiment of the present invention. In the embodiment illustrated in FIGS. 8A-8B, the internal combustion engine design components retained for conversion to an external combustion engine include, but are not exclusive of, the following: the engine block [1], crankshaft [8], bearings and caps to secure the crankshaft [8] to the engine block [1], connecting rod(s) [9] with cap(s) and bearings to secure the connecting rod(s) [9] to the crankshaft [8], and piston(s) [31] with wrist pins, retainers and rings [32-33] to secure the piston(s) [31] to the connecting rod(s) [9] and seal the piston(s) [31] within the cylinder wall.

In this embodiment, the internal combustion engine cylinder head(s) may be replaced by a plate [220] of such design, material and strength so as to seal the cylinder [30] in a manner that may contain pressurization by expanding fluid vapor. The expanding fluid vapor may be metered directly into the cylinder [30] from a location which may be on the cylinder plate [220] or the engine block [1]. For example, expanding fluid vapor may be provided by actuated vapor injectors [25b] placed instead of spark plug(s) [34], or the spark plug holes [34] may be sealed, and an actuated vapor injector [25a] may be placed on the plate [220] to introduce expanding fluid vapor into the cylinder [30]. Alternatively, expanding fluid vapor may be introduced by the actuated vapor injector [25b] and exhausted through the actuated vapor injector [25a]. The actuated vapor injector(s) may be actuated by electronic and/or mechanical means. The expanding fluid vapor may then be exhausted to vent the expanding fluid vapor to the atmosphere or to an expanding fluid vapor condenser [50], as illustrated in FIG. 3, or a separately actuated exhaust actuated vapor injector may be used to perform the same or similar function.

In some embodiments of the present invention, for example, as illustrated in FIGS. 8A-8B, the internal combustion engine cylinder head can be replaced with a plate of such design as to seal the top of the operating cylinder with an electronically or mechanically controlled actuated vapor injector attached thereon, whereby the internal combustion engine camshaft, push rods, rocker arms or belts are not be used.

Said plate facilitates the electronically controlled metering of expanding fluid vapor by the elimination of, by example but not exclusive of, the internal combustion engine camshaft, pushrods or camshaft belt, cylinder heads, valve rocker assemblies, rocker arm locks, intake and exhaust valves, valve springs and retainers normally present in an internal combustion engine. In this configuration, an electronically controlled actuated vapor injector may replace the internal combustion engine type intake design. This configuration may require a more sophisticated electronic control, as opposed to a mechanical control of the engine. As well, this embodiment may also reduce a weight and size of the engine where such considerations are required in the end-use application.

The expanding fluid vapor introduced into the cylinder [30] can be exhausted through the cylinder exhaust outlet into the exhaust manifold [40], or may be vented in reverse through the expanding fluid vapor introduction mechanism, or through a secondary component.

In other embodiments of the present invention, the internal combustion engine block may be modified with an opening through the cylinder wall above the lowest point of travel of the top of the piston [31] so as to vent the expanding fluid vapor irrespective of the expanding fluid vapor intake to the cylinder.

The expanding fluid vapor may be recovered as condensate and reheated for a closed loop operation, or vented externally.

Figure 9:
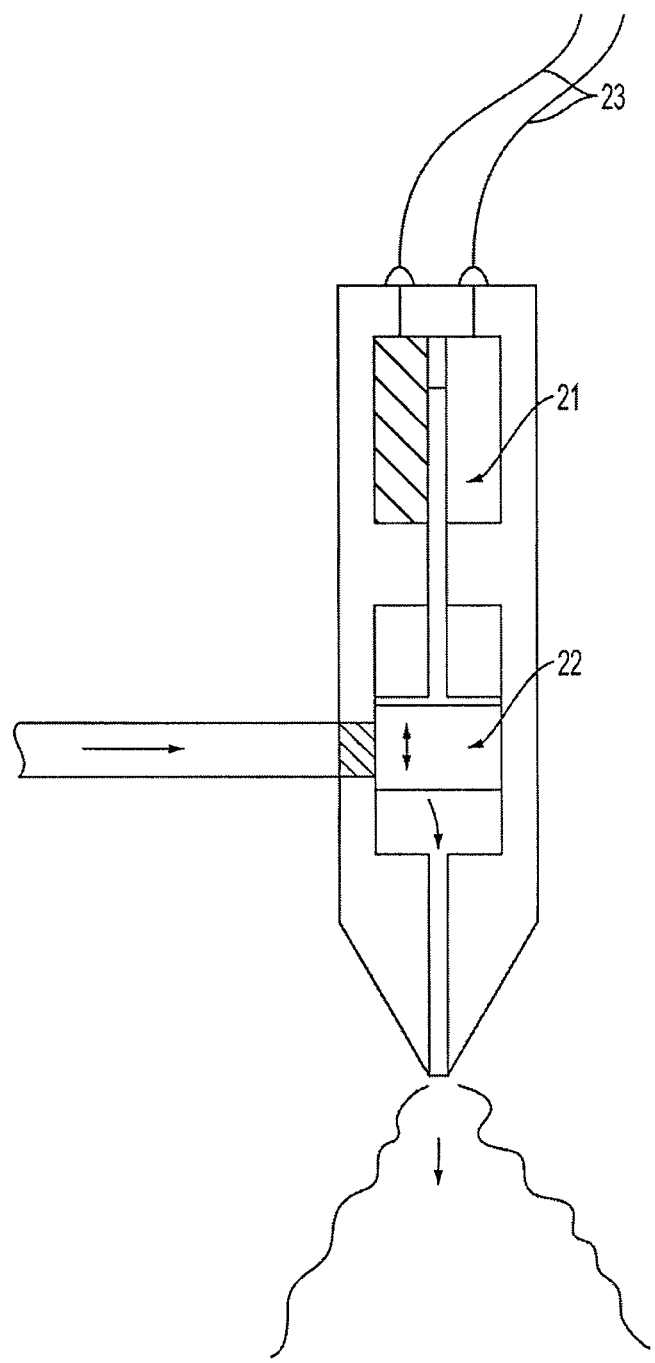
FIG. 9 illustrates an actuated vapor injector (AVI) according to an embodiment of the present invention.

As illustrated in FIG. 9, an actuated vapor injector may comprise an electrically actuated magnet [21] to actuate a plunger [22]. The plunger [22] may normally be in a closed position to block supply of expanding fluid vapor. When triggered, an electrical power source [23] can power the electrically actuated magnet [21] to attract the plunger [22] and open supply of expanding fluid vapor. While a magnetically actuated vapor injector is illustrated in FIG. 9, the present invention is not limited thereto, and other actuating mechanisms can be use to selectively provide expanding fluid vapor supply. For example, another embodiment of the actuated vapor injector noted in FIG. 9 may open and close the valve by mechanical means.

Said actuated vapor injector may be of such design as to operate in a normally closed position and by actuation be opened to allow the passage of expanding fluid vapor through the body of the actuated vapor injector. The duration and timing of said opening duration may be of such a nature as to cause movement of the piston(s) [31] within the cylinder(s) [30] and thereby mechanical motion. The location of the actuated vapor injector(s) in relationship to the cylinder [30] may be in any location and attached to any component which allows its functionality in respect to the expanding fluid vapor and the cylinder [30]. Said actuated vapor injector may be of such design so as allow the expanding fluid vapor to reverse its flow through the actuated vapor injector(s) in an exhaust cycle and thereafter be vented to the atmosphere or directed toward the condenser [50]. In other embodiments of the present invention, the introduction of the expanding fluid vapor into the cylinder [30] may be termed the power stroke of the engine. The expulsion of the expanding fluid vapor from the cylinder may be termed the exhaust stroke of the engine. There is no constraint in the design of the engine to require the exhaust stroke to follow a power stroke, nor a constraint whereby strokes must alternate successively, or that all cylinders [30] in a multi-cylinder application must be in use during the operation of the engine at all speeds. In some embodiments of the invention, the timing and volume of expanding fluid vapor through the actuated vapor injector may cause the engine to decelerate, as opposed to accelerate, the rotational speed of the engine, or the actuated vapor injector(s) may be activated in such a manner as to reverse the rotational direction of the engine. The actuated vapor injector(s) may be operationally coupled to the engine control unit to control an operation thereof.

The expanding fluid vapor may be exhausted from the cylinder [30] and vented to the atmosphere, or may be collected in a condenser [50] and returned to a high density fluid reservoir (EFR) [60]. In embodiments where the expanding fluid vapor is vented to the atmosphere, the engine may also include a high density fluid tank to store a source of high density fluid. In embodiments where a condenser [50] is used, the expanding fluid vapor is expelled from the cylinder [30] in the exhaust stroke and a tube of such volume, shape, design, insulation, material and connection is used so as to move the expanding fluid vapor to the condenser [50]. Said tube can include the exhaust manifold [40] of the internal combustion engine, as illustrated in FIG. 3. Said condenser [50] may be in a location whereby it is exposed to ambient atmospheric temperature in such a manner as to cool the expanding fluid vapor in order for the expanding fluid vapor to return to a liquid state. The condenser [50] may be equipped with sensors to monitor atmospheric, expanding fluid vapor, and high density fluid temperatures. A cooling fan (not illustrated) may be connected to the condenser [50] to increase a cooling rate of the expanding fluid vapor to high density fluid, whereby said fan activation may be operationally controlled by the engine control unit or independently by a temperature sensor. Said condenser [50] may be connected to an electrical or mechanical high density fluid pump [51] to move the condensate by tube(s) of such volume, shape, design, insulation, material and connection to the high density fluid reservoir [60].

In addition to the embodiments described above to form an external combustion engine using a conventional internal combustion engine design base, additional modifications can be made to a conventional internal combustion engine design to maximize efficiency and functionality of the external combustion engine.

A disadvantage of conventional engines converting vapor expansion force into mechanical work is that as soon as the vapor starts to condense, the vapor contracts in volume and ceases to be converted into mechanical work. Accordingly, maintaining the vapor above the condensation temperature increases the efficiency by which the vapor expansion force of the expanding fluid vapor is converted into mechanical work. Embodiments of the present invention utilize a novel approach of heat shrouding the power cylinders so as to scavenge as much heat as possible from the fuel combustion event. That is, as illustrated in FIGS. 2-3, exhaust heat produced by the combustion of fuel in the flash vaporizer is recovered and re-routed to the engine block [1] to heat the power cylinders [30]. Accordingly, it is possible to scavenge heat available from the fuel combustion to heat the expanding fluid vapor in the cylinders [30] to maintain the expanding fluid vapor as high above the temperature point of condensation as possible. The engine maximizes the utility of the heat of combustion by shrouding the cylinders [30] with combustion exhaust heat which would normally be vented to the atmosphere, where it is otherwise wasted and effectively decreases the efficiency of a conventional engine. The engine according to the present invention uniquely shrouds the cylinders [30] by using coolant passages [300] present in conventional internal combustion engine block designs to carry the fuel combustion exhaust heat. In some embodiments, the amount of heat shrouding using the excess heat of combustion is limited or regulated when using carbon-base fuels to limit the effects of radiant heat emitted by those fuels during combustion. Because the coolant passages [300] are placed to remove heat from the cylinders in a conventional internal combustion engine design, they are also optimally placed to heat the cylinders [30] in an external combustion engine according to the present invention. By routing the exhaust heat of the flash vaporizer [10] through the engine block [1], the expanding fluid vapor is kept hot and expanding so as to maximize a mechanical work produced.

Figure 12:
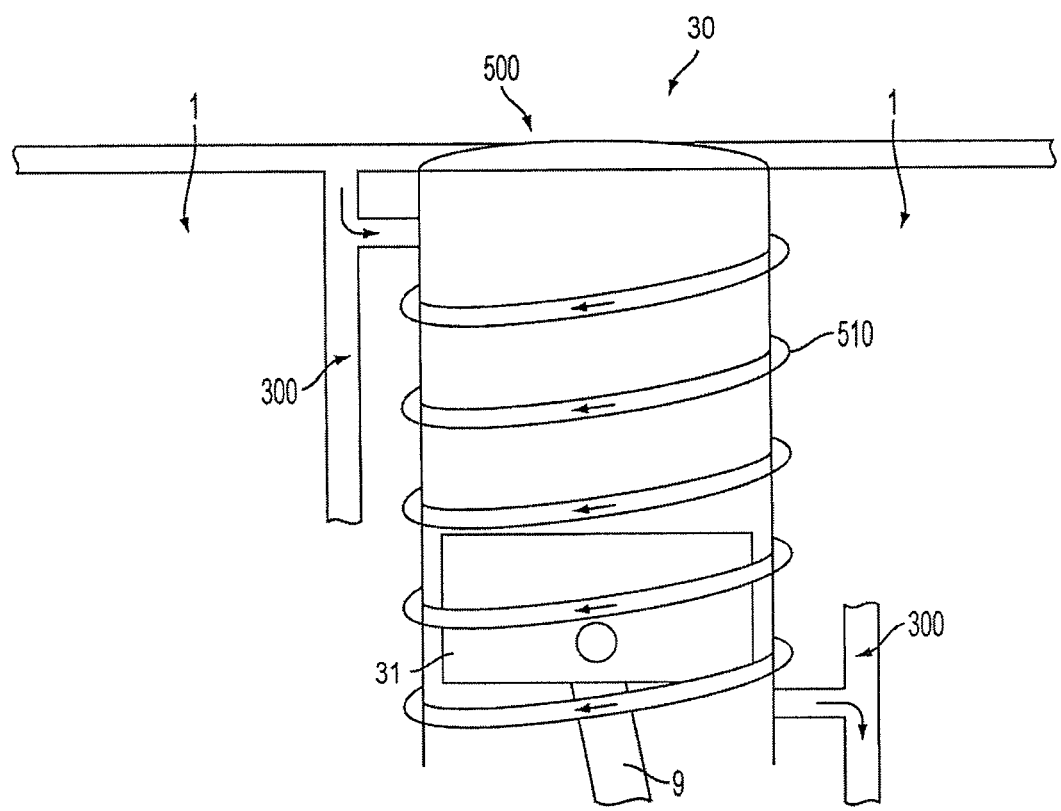
FIG. 12 illustrates a shrouding cylinder sleeve according to an embodiment of the present invention.

In addition, the engine block [1] can be further modified to provide additional shrouding of the cylinders [30] to further increase a thermal shrouding of the external combustion engine. For example, the cylinders [30] may be fitted with a cylinder sleeve having additional passages defined therein to more closely shroud the cylinders [30] with the vaporizer exhaust. FIG. 12 illustrates a shrouding cylinder sleeve according to an embodiment of the present invention. As illustrated in FIG. 12, the engine cylinders [30] may be bored out so as to be fitted with a shrouding cylinder sleeve [500], similar to those normally used in the trade to repair a damaged cylinder. The shrouding cylinder sleeve [500] defines one or more passages [510] to channel the vaporizer exhaust around the cylinder [30] when fitted in the cylinder bore. That is, prior to fitment with the shrouding cylinder sleeve [500], the engine cylinder [30] bore may be engraved with recesses and connected to the coolant passages [300] such that when the sleeve is installed, the shrouding cylinder sleeve [500] covers the engraved recesses to define passages to facilitate the passage of exhaust heat immediately adjacent to the cylinder for optimal heat energy recovery. Moreover, a contact surface of the pistons [31] may be coated with a ceramic layer [301] to protect the piston [31] from any corrosive or damaging effects of the expanding fluid vapor as well as to minimize an absorption of heat by the piston [31], which would decrease the temperature of the expanding fluid vapor, and lower engine efficiency.

In embodiments of the invention using a hydride tank as the hydrogen fuel tank [100], the thermal efficiency of the external combustion engine can be improved by further utilizing the residual heat of the hydrogen combustion. For example, the residual heat of hydrogen combustion can be directed to the hydride tank to release the hydrogen fuel. As described above, in one exemplary embodiment of the present invention, the exhaust heat of the hydrogen combustion in the hydrogen flash vaporizer can be re-routed through the cooling passages [300] of a conventional internal combustion engine design to heat the engine block [1] and maintain a temperature of the expanding fluid vapor. After heating the engine block [1], the exhaust heat can be further re-routed to the hydride tank [100] to heat the hydride and help release hydrogen to be used as fuel. As described above, external combustion engines of the present invention can have a high-grade exhaust at 100-125° C. which can be routed through a hydride tank [100] to release hydrogen for fuel and combustion.

Figure 10:
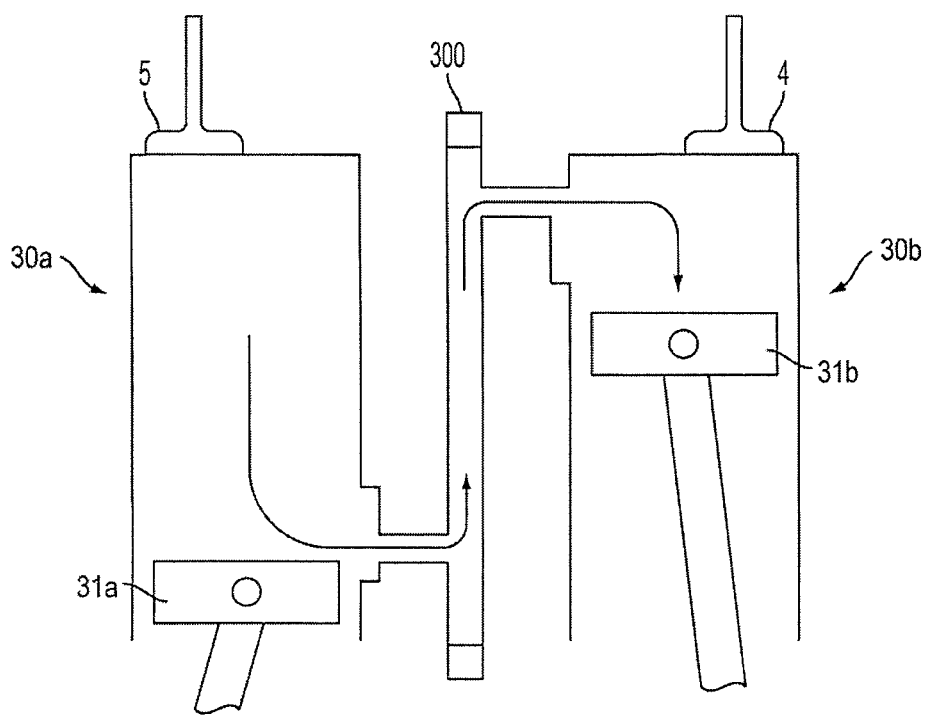
FIG. 10 illustrates cylinder twinning according to an embodiment of the present invention.

In other embodiments of the invention, the engine also has the capability to "twin" piston cylinders to effectively double the mechanical power stroke of the engine. For example, as illustrated in FIG. 10, twining of two cylinders [30] can be produced by introducing the expanding fluid vapor into a first cylinder [30a], which pushes a first piston [31a] downward. In the last 20% or so of the first piston's [31a] travel, cylinder [30a] is slotted to a self contained coolant passage [300] so that the expanding vapor can now escape cylinder [30a] and travel up the coolant passage [300] to a top of a second cylinder [30b], which is slotted at the top. Arranging twin cylinders [30a and 30b] in this communicative manner allows the continued expansion of the expanding fluid vapor to also push a second piston [31b], and thus, double the mechanical work produced (efficiency) by the expanding fluid vapor before it is vented to the condenser [50] or the atmosphere.

Some embodiments of the present invention described above illustrate an external combustion engine. Embodiments of the present invention can be used to build an external combustion engine from scratch or can be used to adapt conventional internal combustion engine designs and components to fabricate an external combustion engine.

The conversion of an internal combustion engine design to external combustion is significantly augmented by the efficient heat energy transference using the high density working fluid (HDF) and the innovative recuperative heat exchange processes described above. In some embodiments, the external combustion engine extracts additional power from the exhaust heat of the fuel combustion, which is uniquely suited to this design due to its ignition characteristics and the absence or limitation of significant radiant heat transfer.

In other embodiments, using a high density fluid allows the external combustion engine to have a smaller displacement volume and a higher efficiency potential than other convention combustion engines, allowing the external combustion engine of the present invention to mirror the efficiency of a Kalina cycle engine, but without the constraints of a Kalina cycle engine. Embodiments of an external combustion engine under the present invention are compact, utilizing existing internal combustion engine internal heat transfer designs in reverse of their original design intentions, thereby requiring a fraction of the volume of a corresponding Kalina cycle design, while increasing an efficiency of converting the expanding fluid vapor pressure to mechanical work.

As described above, the external combustion engine uniquely exploits the ignition temperature and stoichiometric perfection of external fuel combustion under various application loads to recycle heat that would otherwise be wasted through discharge or removal. Because the coolant passages [300] of a conventional internal combustion engine design are not needed for internal combustion engine cooling when converted to an external combustion engine design, they can be modified and utilized to conduct and direct otherwise wasted heat from the fuel combustion exhaust to the power cylinders defined herein as a Berk cycle engine heat scavenging method. The extended application of fuel combustion heat, due to the unique increased recuperative capacity of the engine, thereby extends the expansion event of the high density fluid throughout its full expansion temperature range, creating a Kalina-effect heat scavenging and shrouding of the cylinders to retain heat and optimize vapor expansion conversion to mechanical power.

Some embodiments of the external combustion engine eliminate the need for internal combustion engine components, such as a starter, air filter, ignition system, engine block fuel delivery systems, coolant system, exhaust and anti-pollution devices.

In some embodiments, the flash vaporizer transfers heat from the fuel combustion event to the high density fluid which is first converted from liquid by atomization, and is then vaporized in the flash vaporizer, and the engine extracts mechanical power from the resultant metered expansion of the fluid at a calculated rate of about 2000-2500:1 expansion ratio.

In other embodiments, by shrouding the cylinders with scavenged heat to maximize vapor expansion, and then using the residual heat to release hydrogen as a fuel, the engine can produce 2-3 horsepower per cubic inch of displacement whereas other internal combustion hydrogen engines and fuel cell engines produce approximately one-quarter the power using the same amount of hydrogen fuel.

Figure 13:
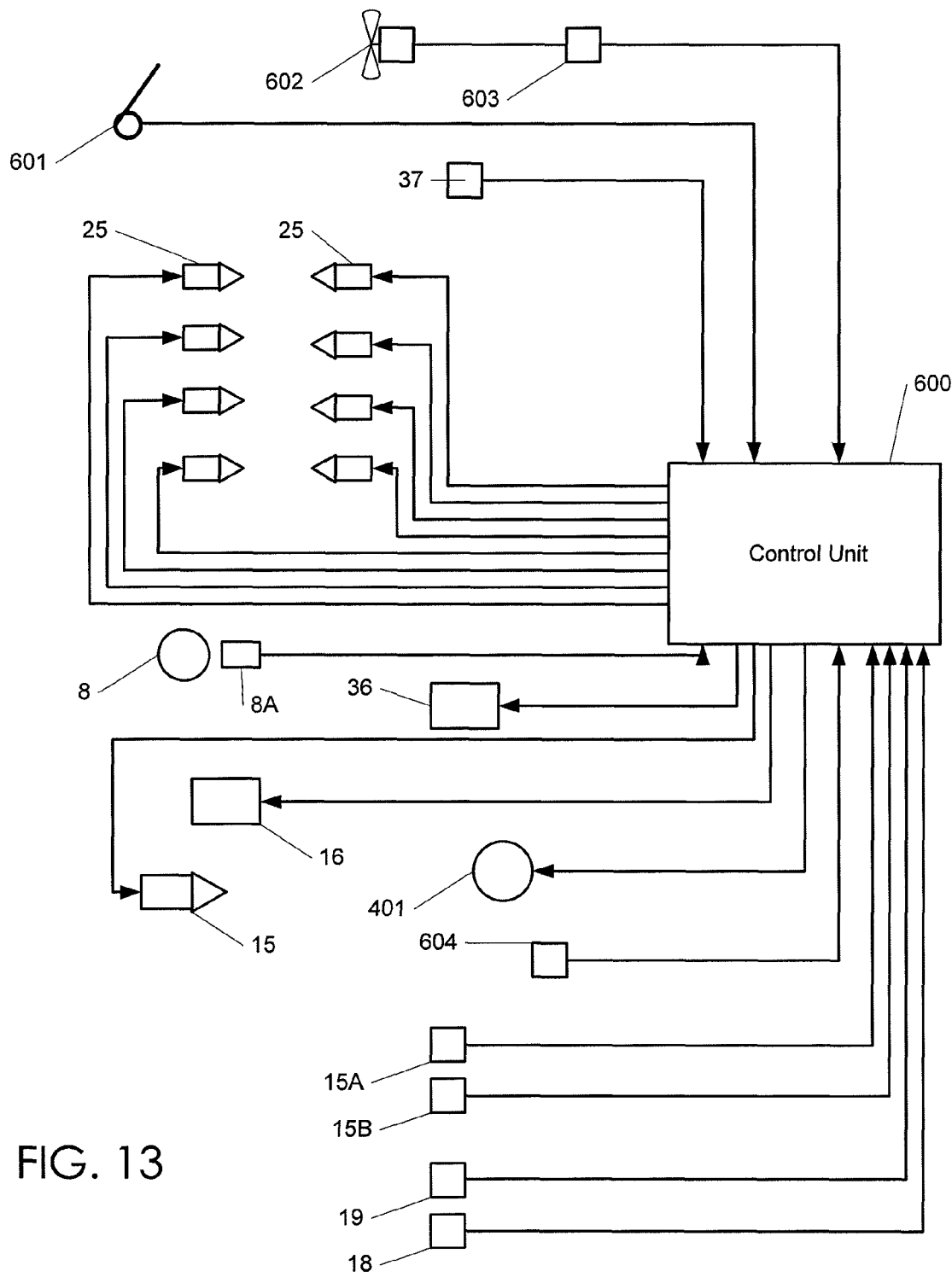
FIG. 13 is a diagram illustrating an interconnection of an engine control unit to various components of the engine according to an embodiment of the present invention.

FIG. 13 illustrates the interconnection of the engine control unit to the various sensors that provide input to the control unit and actuators, valves and the like whose operation are controlled by the engine control unit. The present diagram is a representation and those skilled in the art will be able to make modifications and enhancements thereto. Engine control unit [600] is a microprocessor controlled unit that is in electrical communication with the various sensors and actuators that dictate or influence engine operation. For example, throttle input is received by sensor [601], typically by the user's pressing on the accelerator pedal. Sensors that control the engine performance include flash vaporizer temperature sensor [15A] and flash vaporizer pressure sensor [15B] that determine the volume of high density fluid in the flash vaporizer and monitor the volume of expanding fluid vapor provided to the actuated vapor injector(s) [25]. Also illustrated are engine block temperature sensor [37], engine speed/crankshaft position sensor [8A], condenser fan sensor [602] and thermal switch [603], and carbon fuel sensor [604]. Actuators, valves and the like are shown including flash vaporizer regulator [15], flash vaporizer igniter [16], fuel flow volume regulator [18], fuel shut off [19], air bleed valve actuator [36], bypass valve [401] and actuated vapor injectors [25] shown in two banks. These sensors and actuators may be conventional internal combustion sensors adapted to external combustion engine use, or may be new sensors designed specifically with the external combustion engine.

All of the methods, kits, apparatus, devices, and components disclosed and claimed herein can be made and executed without undue experimentation in light of the present disclosure. Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An external combustion engine, comprising:
a fuel tank to store a fuel;
a vaporizer to receive and combust the fuel, wherein an atomized liquid introduced into the vaporizer is turned into an expanding fluid vapor;
an engine block to receive the expanding fluid vapor and convert an expansion force thereof into mechanical force; and
a vaporizer exhaust system to direct at least a portion of the heat produced by the combustion of the fuel into passages defined in the engine block to shroud the engine block and heat the expanding fluid vapor therein.

2. The external combustion engine of claim 1, wherein the atomized liquid, being a mixture of water and ammonia, comprises at least 50% water.

3. The external combustion engine of claim 1, wherein the engine block is a conventional internal combustion engine block and the flash vaporizer exhaust system directs the heat of the fuel combustion to at least one of coolant passages defined in the internal combustion engine block and other passages within the internal combustion engine block to shroud the internal combustion engine block with the heat of the fuel combustion.

4. The external combustion engine of claim 3, wherein the conventional internal combustion engine block comprises at least one piston within a cylinder, the cylinder incorporating at least one groove connected to the at least one of the coolant passages defined in the internal combustion engine block and the other passages within the internal combustion engine block, and wherein the cylinder is fitted with a shrouding sleeve to define other passages for the heat of the fuel combustion to shroud the piston.

5. The external combustion engine of claim 1, wherein the fuel is a mixture of fuels and the fuel tank stores the mixture of fuels.

6. The external combustion engine f claim 5, wherein the fuel comprises at least one of a liquid fuel and a gaseous fuel.

7. The external combustion engine of claim 6, wherein the fuel comprises compressed or liquefied natural gas.

8. The external combustion engine of claim 1, wherein the vaporizer exhaust system comprises an exhaust bypass to direct at least a portion of the heat produced by the combustion of the fuel away from the passages defined in the engine block.

9. The external combustion engine of claim 1, wherein the vaporizer exhaust system comprises an air valve to control a temperature of the heat directed into the passages defined in the engine block.

10. The external combustion engine of claim 9, wherein the air valve introduces ambient air to the heat directed into the passages defined in the engine block to control a temperature thereof.

* * * * *